United States Patent
Zhang et al.

(10) Patent No.: US 12,296,317 B2
(45) Date of Patent: May 13, 2025

(54) SILICON-BASED SOLID AMINE SORBENT FOR $CO_2$ AND MAKING METHOD THEREOF

(71) Applicant: DeCarbon Technology (Shenzhen) Co., Ltd., Shenzhen (CN)

(72) Inventors: Zuotai Zhang, Shenzhen (CN); Chunyan Li, Shenzhen (CN); Feng Yan, Shenzhen (CN); Xuehua Shen, Shenzhen (CN); Fan Qu, Shenzhen (CN)

(73) Assignee: DeCarbon Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 17/620,286

(22) PCT Filed: Jun. 9, 2021

(86) PCT No.: PCT/CN2021/099178
§ 371 (c)(1),
(2) Date: Dec. 17, 2021

(87) PCT Pub. No.: WO2022/257045
PCT Pub. Date: Dec. 15, 2022

(65) Prior Publication Data
US 2024/0123423 A1    Apr. 18, 2024

(51) Int. Cl.
*B01J 20/22* (2006.01)
*B01D 3/36* (2006.01)
(Continued)

(52) U.S. Cl.
CPC .......... *B01J 20/22* (2013.01); *B01D 3/36* (2013.01); *B01D 53/02* (2013.01);
(Continued)

(58) Field of Classification Search
CPC ...... B01D 3/36; B01D 53/02; B01D 2253/20; B01D 2257/504; B01J 20/103;
(Continued)

(56) References Cited

U.S. PATENT DOCUMENTS

| 10,065,174 B1 | 9/2018 | Wifong et al. |
| 2011/0031179 A1* | 2/2011 | Chen ................ B01J 20/28004 502/406 |

(Continued)

FOREIGN PATENT DOCUMENTS

| CN | 1250746 A | 4/2000 |
| CN | 103406092 A | 11/2013 |

(Continued)

OTHER PUBLICATIONS

International Search Report for Application No. PCT/CN2021/099129, mailed Mar. 4, 2022, (8 pages).
(Continued)

*Primary Examiner* — Brian A McCaig
(74) *Attorney, Agent, or Firm* — Kagan Binder, PLLC

(57) ABSTRACT

A silicon-based solid amine sorbent for $CO_2$ and the making method thereof including: providing a silicon source liquid which is a silicate solution or a liquid organosilicate, wherein the silicate solution comprises water and a first silicate dissolved in the water; mixing the silicon source liquid with a precipitant to perform a precipitation reaction to obtain a product liquid containing a precipitate, wherein the precipitate is a second silicate or silicic acid; filtering out the precipitate and washing the precipitate with water; mixing the precipitate filtrated out but not dried yet with an organic alcohol and then performing an azeotropic distillation to obtain a dehydrated precipitate; calcining the dehydrated precipitate to obtain a silicon-based support, wherein the silicon-based support is a powder of the second silicate (Continued)

powder or a silica powder; and impregnating the silicon-based support with an organic amine solution and then drying to obtain the silicon-based amine-containing solid sorbent for $CO_2$.

16 Claims, 1 Drawing Sheet

(51) Int. Cl.
    *B01D 53/02*     (2006.01)
    *B01J 20/28*     (2006.01)
    *B01J 20/30*     (2006.01)
    *B01J 20/32*     (2006.01)

(52) U.S. Cl.
    CPC ... *B01J 20/28061* (2013.01); *B01J 20/28064* (2013.01); *B01J 20/28076* (2013.01); *B01J 20/3078* (2013.01); *B01J 20/3204* (2013.01); *B01J 20/3244* (2013.01); *B01J 20/3248* (2013.01); *B01D 2253/20* (2013.01); *B01D 2257/504* (2013.01)

(58) Field of Classification Search
    CPC .................. B01J 20/22; B01J 20/28061; B01J 20/28064; B01J 20/28076; B01J 20/30; B01J 20/3078; B01J 20/3084; B01J 20/3204; B01J 20/3244; B01J 20/3248; Y02C 20/40
    See application file for complete search history.

(56) References Cited

U.S. PATENT DOCUMENTS

| | | |
|---|---|---|
| 2018/0050322 A1 | 2/2018 | Kimura et al. |
| 2020/0197905 A1 | 6/2020 | Negami et al. |

FOREIGN PATENT DOCUMENTS

| | | |
|---|---|---|
| CN | 103521187 A | 1/2014 |
| CN | 103785349 A | 5/2014 |
| CN | 106890621 A | 6/2017 |
| CN | 109569517 A | 4/2019 |
| CN | 111298763 A | 6/2020 |

OTHER PUBLICATIONS

International Search Report for PCT Application No. PCT/CN2021/099178, mailed Mar. 4, 2022, (4 pages).

Utility U.S. Appl. No. 17/620,420, filed Dec. 17, 2021 (Not attached).

* cited by examiner

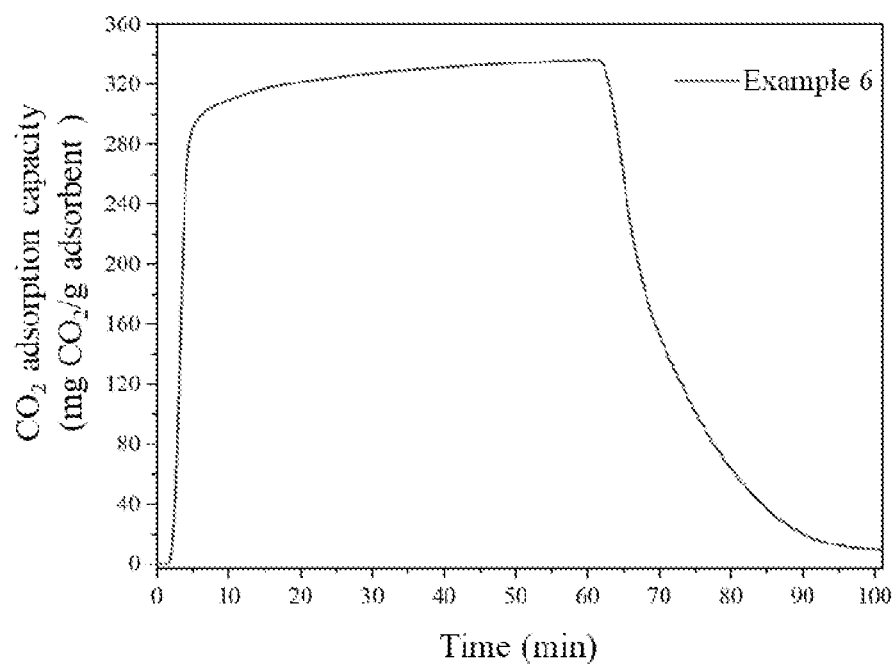

SILICON-BASED SOLID AMINE SORBENT FOR CO$_2$ AND MAKING METHOD THEREOF

TECHNICAL FIELD

The present disclosure relates to the field of purification technology for adsorbing CO$_2$ gas, in particular to a silicon-based solid amine sorbent for CO$_2$ and a making method thereof.

BACKGROUND

With the economic development and the social progress, fossil fuels have become the most important energy source for humans. However, in the use of the fossil fuels, a large amount of greenhouse gas CO$_2$ is emitted into the atmospheric environment, causing a sharp increase in global CO$_2$ concentration and an irreversible disaster to the human living environment, such as global warming, glaciers melting, and sea level rising. To cope with the threat of greenhouse gases to human survival, the world's countries pledged in the Paris Agreement to control the global warming below 2° C. by the year 2050.

However, as a cheap energy with large reserves, fossil fuels are still the most important primary energy in the social and economic development in the immediate future. Therefore, the Carbon Capture and Storage (CCS) technology is urgently needed, which is currently recognized as the only technical means capable of achieving large-scale emission reductions in this field. At present, the most widely used CO$_2$ capture technology in the industry is the liquid ammonia adsorption technology due to its good adsorption effect and high selectivity. However, the liquid ammonia has the disadvantages of easy to be volatilized, equipment corrosion, non-recycling, etc., and thus brings great challenges to the equipment and operation costs.

In recent years, the solid amine sorbent has received widespread attention due to its high selectivity, good adsorption performance, and easy regeneration. The solid amine sorbent is composed of a support and an organic amine. The commonly used support includes the zeolite, the MOF, the polymer resin, the carbon nanotubes, the silicon-based support, and the aluminum-based support. Among them, the silicon-based support which is currently commonly used has a specific surface area of about 100 m$^2$/g to 400 m$^2$/g and a pore volume of about 1.0 cm$^3$/g to 2.0 cm$^3$/g, which greatly limits the application of the silicon-based support in modification, adsorption, and separation. Since the pore volume of the silicon support is less than 2.0 cm$^3$/g, and a loading amount of the organic amine is generally less than 50%, the CO$_2$ adsorption capacity of the silicon-based solid amine is difficult to be further increased.

SUMMARY

In view of this, it is necessary to provide a silicon-based solid amine sorbent for CO$_2$ with a large support pore volume and a high CO$_2$ adsorption capacity.

A making method of a silicon-based solid amine sorbent for CO$_2$ includes:
providing a silicon source liquid which is a silicate solution or a liquid organosilicate, wherein the silicate solution includes water and a first silicate dissolved in the water;
mixing the silicon source liquid with a precipitant to perform a precipitation reaction to obtain a product liquid containing a precipitate, wherein the precipitate is a second silicate or silicic acid;
filtering out the precipitate and washing the precipitate with water;
mixing the precipitate filtrated out but not dried yet with an organic alcohol and then performing an azeotropic distillation to obtain a dehydrated precipitate;
calcining the dehydrated precipitate to obtain a silicon-based support which is a powder of the second silicate or a silica powder; and
impregnating the silicon-based support with an organic amine solution and then drying the silicon-based support impregnated with the organic amine solution to obtain the silicon-based solid amine sorbent for CO$_2$.

In an embodiment, the silicon source liquid is the silicate solution, and the first silicate is Na$_2$SiO$_3$ or K$_2$SiO$_3$.

In an embodiment, a concentration of the first silicate in the silicate solution is 5 g/L to 100 g/L.

In an embodiment, the precipitant is a CO$_2$-containing gas or a Ca(OH)$_2$ solution.

In an embodiment, a concentration of CO$_2$ in the CO$_2$-containing gas is 15 vol. % to 40 vol. %, and a flow rate of the CO$_2$-containing gas is 400 mL/min to 2000 mL/min per liter of the silicate solution.

In an embodiment, a concentration of Ca(OH)$_2$ in the Ca(OH)$_2$ solution is 0.05 mol/L to 1 mol/L.

In an embodiment, the silicon source liquid is the liquid organosilicate, and the liquid organosilicate is selected from ethyl orthosilicate, methyl orthosilicate, and a combination thereof.

In an embodiment, the precipitant is a mixed liquid of n-butyraldehyde, cetyl trimethyl ammonium bromide, and ammonium hydroxide.

In an embodiment, the mixed liquid is prepared by a method includes:
mixing n-butyraldehyde, cetyl trimethyl ammonium bromide, and water uniformly to obtain a premixed liquid; and
mixing ammonium hydroxide with the premixed liquid uniformly to obtain the mixed liquid.

In an embodiment, a ratio of the n-butyraldehyde, the cetyl trimethyl ammonium bromide, the water, and the ammonium hydroxide in the mixed liquid is (5 ml-20 ml):(0.5 g-10 g):(10 ml-150 ml):(5 ml-100 ml), and a mass fraction of the ammonium hydroxide is 25% to 28%.

In an embodiment, a volume ratio of the mixed liquid to the liquid organosilicate is 5:1 to 20:1.

In an embodiment, a temperature of the precipitation reaction between the silicon source liquid and the precipitant is 25° C. to 80° C.

In an embodiment, the organic alcohol is selected from ethanol, propanol, n-butanol, isobutanol, and any combination thereof.

In an embodiment, a temperature of the calcining is 400° C. to 600° C.

In an embodiment, the organic amine solution includes an organic solvent and an organic amine dissolved in the organic solvent. The organic amine is selected from polyethyleneimine, diethylenetriamine, tetraethylenepentamine, pentaethylenehexamine, and any combination thereof.

The organic solvent is selected from methanol, ethanol, acetone, and any combination thereof.

In an embodiment, a concentration of the organic amine in the organic amine solution is 4 g/L to 200 g/L. A ratio of the silicon-based support to the organic amine solution is 10 g/L to 100 g/L.

A silicon-based solid amine sorbent for $CO_2$ is made by the making method as described above.

The silicon-based solid amine sorbent for $CO_2$ and the making method thereof provided in the present disclosure have the following advantages:

(1) Only a small amount of surfactant is added or no surfactant is added, and neither template nor pore-enlarging agent is added in the making process. The organic alcohol used in the azeotropic distillation is cheap, recyclable and reuseable, more environmentally friendly, and advantageous in economy.

(2) The operation process is simple, the reaction conditions are mild, the operation is easy to be controlled, and no complicated equipment is required. Thus, the method has strong market competitiveness and is suitable for industrial production.

(3) The pore volume and specific surface of the prepared silicon-based support are larger than 800 $m^2/g$ and 3.5 $cm^3/g$, respectively, which breaks through the technical bottleneck in the increase of the pore volume of silicon-based materials; and (4) The saturated $CO_2$ adsorption capacity of the synthesized solid amine sorbent for $CO_2$ reaches 336 mg/g. The solid amine sorbent for $CO_2$ can be regenerated in pure Ar gas flow condition. The adsorption capacity of the solid amine sorbent for $CO_2$ is merely attenuated by less than 7% after 10 cycles, exhibiting an excellent adsorption-regeneration cycle performance.

BRIEF DESCRIPTION OF THE DRAWINGS

To describe the technical solutions of the embodiments of the present disclosure or the prior art more clearly, the following briefly introduces the accompanying drawings required for describing the embodiments or the prior art. Apparently, the accompanying drawings in the following description show some embodiments of the present disclosure, and persons of ordinary skill in the art may also derive other drawings from these accompanying drawings without creative efforts.

FIG. 1 is a first adsorption curve for $CO_2$ of the solid amine sorbent for $CO_2$ in the Example 6.

DETAILED DESCRIPTION OF THE EMBODIMENTS

In order to make the purposes, the technical solutions and the advantages of the present disclosure more clear, the present disclosure will be further described in detail below with reference to the embodiments and accompanying drawings. It is understood that the specific embodiments described herein are merely illustrative of the present disclosure and are not intended to limit the present disclosure.

The present disclosure provides a making method of a silicon-based solid amine sorbent for $CO_2$, including:

S1: providing a silicon source liquid which is a silicate solution or a liquid organosilicate, wherein the silicate solution includes water and a first silicate dissolved in the water;

S2: mixing the silicon source liquid with a precipitant to perform a precipitation reaction to obtain a product liquid containing a precipitate, wherein the precipitate is a second silicate or silicic acid;

S3: filtering out the precipitate and washing the precipitate with water;

S4: mixing the precipitate filtrated out but not dried yet with an organic alcohol and then performing an azeotropic distillation to obtain a dehydrated precipitate;

S5: calcining the dehydrated precipitate to obtain a silicon-based support, wherein the silicon-based support is a powder of the second silicate or a silica powder; and S6: impregnating the silicon-based support with an organic amine solution and then drying the silicon-based support impregnated with the organic amine solution to obtain the silicon-based solid amine sorbent for $CO_2$.

In step S1, the silicon source liquid can be the silicate solution which can be an aqueous solution of the first silicate. The first silicate can be a water-soluble silicate, such as $Na_2SiO_3$ or $K_2SiO_3$. The mass concentration of the first silicate in the silicate solution can be 5 g/L to 100 g/L.

The silicon source liquid can also be the liquid organosilicate, such as ethyl orthosilicate, methyl orthosilicate, and a combination thereof.

In step S2, the precipitant is used to carry out the precipitation reaction with the first silicate or the liquid organosilicate, so that the silicate ion from the first silicate or the liquid organosilicate can form the precipitate.

When the precipitation reaction is carried out with the first silicate, the precipitant can be a $CO_2$-containing gas or a $Ca(OH)_2$ solution. The precipitate can be the second silicate that is insoluble in water.

In an embodiment, the $CO_2$-containing gas is introduced into the silicate solution to carry out the precipitation reaction. The concentration of $CO_2$ in the $CO_2$-containing gas can be 15 vol. % to 40 vol. %. The flow rate of the $CO_2$-containing gas can be 400 mL/min to 2000 mL/min per liter of the silicate solution. In this way, the precipitate and the silicon-based support having large specific surface areas and large pore volumes can be obtained.

In an embodiment, the $Ca(OH)_2$ solution is added dropwise into the silicate solution or directly mixed with the silicate solution to carry out the precipitation reaction. In an embodiment, a method for preparing the $Ca(OH)_2$ solution includes: adding 0.005 mol to 0.2 mol of $Ca(OH)_2$ into 100 mL to 200 mL of water, stirring and mixing thoroughly to obtain the $Ca(OH)_2$ solution. In an embodiment, the dropping rate of the $Ca(OH)_2$ solution is 10 mL/min to 50 mL/min.

When the precipitation reaction is carried out with the liquid organosilicate, the precipitant can be a mixed liquid of n-butyraldehyde, cetyl trimethyl ammonium bromide (CTAB), and ammonium hydroxide. The precipitate can be the silicic acid.

In an embodiment, a method for preparing the mixed liquid includes: mixing n-butyraldehyde, cetyl trimethyl ammonium bromide, and water uniformly to obtain a premixed liquid; and mixing ammonium hydroxide with the premixed liquid uniformly to obtain the mixed liquid.

In an embodiment, the liquid organosilicate is added dropwise into the mixed liquid or directly mixed with the mixed liquid to carry out the precipitation reaction. In an embodiment, the dropping rate of the liquid organosilicate is 10 mL/min to 50 mL/min.

In an embodiment, a method for preparing the mixed liquid is provided as follows. 5 mL to 200 mL of n-butyraldehyde and 0.5 g to 10 g of CTAB are added into 10 mL to 150 mL of deionized water and stirred at room temperature for 30 min with a stirring rate of 400 r/min to 1000 r/min. After n-butyraldehyde and CTAB are dispersed and mixed for 30 min, 5 mL to 100 mL of $NH_4OH$ with a mass fraction of 25%-28% is quickly added and stirred at room temperature for 1 h with a stirring rate of 400 r/min to 1000 r/min to obtain the mixed liquid.

In an embodiment, 2 mL to 50 mL of the liquid organosilicate can be added into the above mixed liquid to carry out the precipitation reaction.

In an embodiment, the reaction temperature of the precipitation reaction can be 25° C. to 80° C. The reaction time can be 0.1 hours to 48 hours. The precipitation reaction can be carried out under stirring. The stirring rate can be 400 r/min to 1000 r/min.

In step S3, the precipitate can be filtered out from the product liquid and washed with deionized water to obtain a filter cake of the precipitate.

The filter cake of the precipitate can be directly mixed with the organic alcohol and then subjected to the azeotropic distillation in step S4 without being dried, thereby obtaining the dehydrated precipitate.

The organic alcohol can be selected from ethanol, propanol, n-butanol, isobutanol, and any combination thereof.

In an embodiment, the filter cake of the precipitate is uniformly dispersed into 50 mL to 200 mL of the organic alcohol to form a dispersion liquid, and then the dispersion liquid is transferred to a rotary evaporator to be subjected to the azeotropic distillation. Specifically, the dispersion liquid is distilled for 0.5 to 2 hours after its temperature reaching the azeotropic point of water and the organic alcohol, and then distilled for 0.5 to 2 hours at the boiling point of the organic alcohol.

After the distillation, the distilled product can be separated out and dried, thereby obtaining the dehydrated precipitate. In an embodiment, the distilled product is centrifuged in a centrifuge at a rotate speed of 8000 r/min for 5 min, and dried at 60° C. to 100° C. for 12 h to obtain the dehydrated precipitate.

In step S5, the dehydrated precipitate can be calcined in a muffle furnace at 400-600° C. for 4 to 8 hours, to obtain the second silicate (such as nano-calcium silicate) or silica which is used as the silicon-based support.

In step S6, the organic amine solution includes an organic solvent and an organic amine dissolved in the organic solvent. The organic amine can be selected from polyethyleneimine, diethylenetriamine, tetraethylenepentamine, pentaethylenehexamine, and any combination thereof. The organic solvent can be selected from methanol, ethanol, acetone, and any combination thereof.

The concentration of the organic amine in the organic amine solution is 4 g/L to 200 g/L, for example, 20 g/L to 180 g/L, 50 g/L to 180 g/L, and 100 g/L to 180 g/L. The ratio of the silicon-based support to the organic amine solution can be 10 g/L to 100 g/L, for example, 20 g/L to 80 g/L, such as 20 g/L to 40 g/L. In that case, the silicon-based solid amine sorbent for $CO_2$ with a high loading amount of the organic amine can be obtained, and the organic amine can be uniformly distributed on the silicon-based support.

The silicon-based support can be impregnated with the organic amine solution by dispersing the silicon-based support into the organic amine solution. The silicon-based solid amine sorbent for $CO_2$ can be obtained by directly drying the organic amine solution in which the silicon-based support is dispersed.

After the silicon-based solid amine sorbent for $CO_2$ is obtained, the $CO_2$ adsorption capacity and the adsorption-desorption cycle performance of the silicon-based solid amine sorbent for $CO_2$ can be measured. In an embodiment, the silicon-based solid amine sorbent for $CO_2$ performs the adsorption for a gas flow containing 15 vol. %~100 vol. % of $CO_2$ at 30° C. to 110° C., and then is regenerated in a pure Ar gas flow at 90° C. to 140° C. The adsorption-desorption test is cycled for 10 times.

Example 1

(1) The $Na_2SiO_3$ solution with a mass concentration of 40 g/L was placed into a closed reactor designed with a vent. The reactor was heated to 80° C. The $CO_2$ gas with a concentration of 15 vol. % and a flow rate of 400 mL/min per liter of $Na_2SiO_3$ solution was introduced into the reactor to perform the precipitation reaction. After 15 minutes, the gas introduction was stopped, and the product liquid was taken out.

(2) The precipitate in the product liquid was filtered out and washed with deionized water for several times. The filter cake was evenly dispersed into 100 mL of butanol and then transferred to a rotary evaporator connected with a condensed water circulator to be subjected to an azeotropic distillation. The distillation is performed firstly at 93° C. (the azeotropic point of water and n-butanol) for 1 h and then at 117° C. (the boiling point of n-butanol) for 1 h.

(3) The sample obtained after the azeotropic distillation was cooled to room temperature, placed in a centrifuge, and centrifuged at the rotate speed of 8000 r/min for 5 min. The separated and collected sample was dried at 100° C. for 12 h, and then calcined at 500° C. for 4 h. After cooling, a nano-silica with a large pore volume was collected.

(4) 2.2 g of polyethyleneimine (PEI) was added, dissolved, and dispersed into 25 mL of methanol, and then 1 g of nano-silica powder was added and fully stirred at a rotate speed of 400 r/min. After the methanol was evaporated, the residual was placed in a vacuum drying oven and dried at 60° C. for 5 h, thereby obtaining a nano silicon-based solid amine sorbent for $CO_2$.

(5) The obtained nano silicon-based solid amine sorbent for $CO_2$ performed the adsorption for 100 vol. % $CO_2$ gas flow at 90° C., and then was regenerated in the pure Ar gas flow at 120° C. The adsorption-desorption test was cycled for 10 times.

Example 2

(1) A $Na_2SiO_3$ solution with a mass concentration of 60 g/L was placed into a closed reactor designed with a vent. The reactor was heated to 50° C. The gas containing $CO_2$ with a concentration of 15 vol. % and a flow rate of 600 mL/min per liter of $Na_2SiO_3$ solution was introduced to perform the precipitation reaction. After 10 minutes, the gas introduction was stopped and the product liquid was taken out.

(2) The precipitate in the product liquid was filtered out and washed with deionized water for several times. The filter cake was evenly dispersed into 100 mL of butanol, and then transferred to a rotary evaporator connected with a condensed water circulator to be subjected to an azeotropic distillation. The distillation is performed at 93° C. (the azeotropic point of water and n-butanol) for 1 h, and then at 117° C. (the boiling point of n-butanol) for 1 h.

(3) The sample obtained after the azeotropic distillation was cooled to room temperature, placed into a centrifuge, and centrifuged at a rotate speed of 8000 r/min for 5 min. The separated and collected sample was dried at 100° C. for 12 h, and then calcined at 500° C. for 6 h. After cooling, a nano-silica with a large pore volume was collected.

(4) 2.2 g of polyethyleneimine (PEI) was added, dissolved, and dispersed into 25 mL of methanol, and then 1 g of nano-silica powder was added and fully stirred at a rotate speed of 400 r/min. After the methanol was evaporated, the residual was placed into a vacuum drying oven and dried at 60° C. for 5 h, thereby obtaining a nano silicon-based solid amine sorbent for $CO_2$.

(5) The obtained nano silicon-based solid amine sorbent for $CO_2$ performed the adsorption for the gas flow containing 40 vol. % $CO_2$ at 75° C., and then was regenerated in the pure Ar gas flow at 100° C. The adsorption-desorption test was cycled for 10 times.

Example 3

(1) The $Na_2SiO_3$ solution with a mass concentration of 6.6 g/L was added dropwise into 0.08 mol/L of $Ca(OH)_2$ solution at a dropping rate of 25 mL/min and then a reaction was carried out for 16 h at a stirring rate of 500 r/min.

(2) The precipitate was filtered out and washed with deionized water as a washing liquid for several times. The filter cake was evenly dispersed into 100 mL of butanol, and then transferred to a rotary evaporator connected with a condensed water circulator to be subjected to an azeotropic distillation. The distillation was performed firstly at 93° C. (the azeotropic point of reflux of water and n-butanol) for 1 h, and then at 117° C. (the boiling point of n-butanol) for 1 h.

(3) The sample obtained after the azeotropic distillation was cooled to room temperature, placed into a centrifuge, and centrifuged at a rotate speed of 8000 r/min for 5 min. The separated and collected sample was dried at 80° C. for 12 h, and then calcined at 500° C. for 4 h. After cooling, a nano-calcium silicate was collected.

(4) 2.2 g of polyethyleneimine (PEI) was added, dissolved, and dispersed into 25 mL of methanol, and then 1 g of nano-calcium silicate powder was added and fully stirred at a rotate speed of 400 r/min. After the methanol was evaporated, the residual was placed into a vacuum drying oven and dried at 60° C. for 5 h, thereby obtaining a nano silicon-based solid amine sorbent for $CO_2$.

(5) The obtained nano silicon-based solid amine sorbent for $CO_2$ performed the adsorption for 100 vol. % $CO_2$ gas flow at 90° C., and then was regenerated in the pure Ar gas flow at 120° C. The adsorption-desorption test was cycled for 10 times.

Example 4

(1) The $Na_2SiO_3$ solution with a mass concentration of 15 g/L was added dropwise into 0.2 mol/L of $Ca(OH)_2$ solution at a dropping rate of 25 mL/min, and then a reaction was carried out for 20 h at a stirring rate of 500 r/min.

(2) The precipitate was filtered out and washed with deionized water as a washing liquid for several times. The filter cake was evenly dispersed into 100 mL of butanol, and then transferred to a rotary evaporator connected with a condensed water circulator to be subjected to an azeotropic distillation. The distillation was performed firstly at 93° C. (the azeotropic point of water and n-butanol) for 1 h, and then at 117° C. (the boiling point of n-butanol) for 2 h.

(3) The sample obtained after the azeotropic distillation was cooled to room temperature, placed into a centrifuge, and centrifuged at 8000 r/min for 5 min. The separated and collected sample was dried at 100° C. for 12 h, and then calcined at 500° C. for 6 h. After cooling, a nano-calcium silicate was collected.

(4) 1.56 g of polyethyleneimine (PEI) was added, dissolved, and dispersed into 25 mL of methanol, and then 1 g of nano-calcium silicate powder was added and fully stirred at a rotate speed of 400 r/min. After the methanol was evaporated, the residual was placed in a vacuum drying oven and dried at 60° C. for 5 h, thereby obtaining a nano silicon-based solid amine sorbent for $CO_2$.

(5) The obtained nano silicon-based solid amine sorbent for $CO_2$ performed the adsorption for the gas flow containing 40 vol. % $CO_2$ at 60° C., and then was regenerated in the pure Ar gas flow at 110° C. The adsorption-desorption test was cycled for 10 times.

Example 5

(1) 15 mL of n-butyraldehyde and 0.64 g of CTAB were added into 12 mL of deionized water, and stirred at room temperature (25° C.) for 30 minutes with a stirring rate of 400 r/min. After 30 minutes of dispersion and mixing of n-butyraldehyde and CTAB, 6 mL of $NH_4OH$ with a mass fraction of 25%-28% was quickly added, and stirred at room temperature (25° C.) for 1 h with a stirring rate of 400 r/min.

(2) After $NH_4OH$ was dispersed and mixed for 1 h, 2.8 mL of TEOS was added and stirred at room temperature (25° C.) for 24 h with a stirring rate of 500 r/min.

(3) The silicic acid precipitate synthesized by hydrolysis was washed with deionized water for several times to remove excess butyraldehyde, and then filtrated with a vacuum pump to form a filter cake in which most of $H_2O$ in the sample was removed. The collected filter cake was mixed with 150 mL of n-butanol, placed on a magnetic stirrer, fully stirred, evenly dispersed, and then transferred to a rotary evaporator connected with a condensed water circulator to be subjected to an azeotropic distillation. The distillation is performed firstly at 93° C. (the azeotropic point of water and n-butanol) for 0.5 h, and then at 117° C. (the boiling point of n-butanol) for 1 h.

(4) After cooling, the mixture was centrifuged with a centrifuge at a rotate speed of 8000 r/min for 5 min. The separated and collected sample was dried at 100° C. for 12 h, and then calcined at 550° C. for 6 h. After cooling, a nanoporous silica was collected.

(5) 4.5 g of polyethyleneimine (PEI) was added, dissolved, and dispersed into 25 mL of methanol, and then 1 g of nano-silica powder was added and fully stirred at a rotate speed of 400 r/min. After the methanol was evaporated, the residual was placed in a vacuum drying oven and dried at 60° C. for 5 h, thereby obtaining a nano silicon-based solid amine sorbent for $CO_2$.

(6) The obtained nano silicon-based solid amine sorbent for $CO_2$ performed the adsorption for the gas flow containing 40 vol. % $CO_2$ at 60° C., and then was regenerated in the pure Ar gas flow at 100° C. The adsorption-desorption test was cycled for 10 times.

Example 6

(1) 150 mL of n-butyraldehyde and 6.4 g of CTAB were added into 120 mL of deionized water, and stirred at room temperature (25° C.) for 30 minutes with a stirring rate of 600 r/min. After 30 minutes of dispersion and mixing of n-butyraldehyde and CTAB, 60 mL of $NH_4OH$ with a mass fraction of 25%-28% was quickly added, and stirred at room temperature (25° C.) for 1 h with a stirring rate of 600 r/min.

(2) After $NH_4OH$ was dispersed and mixed for 1 h, 28 mL of TEOS was added and stirred at room temperature (25° C.) for 48 h with a stirring rate of 1000 r/min.

(3) The silicic acid precipitate synthesized by hydrolysis was washed with deionized water for several times to remove excess butyraldehyde, and then filtrated with a vacuum pump to form a filter cake in which most of $H_2O$ in the sample was removed. The collected filter cake was divided into two batches. Each batch is mixed with 150 mL of n-butanol, placed on a magnetic stirrer, fully stirred, evenly dispersed, and then transferred to a rotary evaporator connected with a condensed water circulator to be subjected to an azeotropic distillation. The distillation was performed firstly at 93° C. (the azeotropic point of water and n-butanol) for 1 h, and then at 117° C. (the boiling point of n-butanol) for 1 h.

(4) After cooling, the mixture was centrifuged with a centrifuge at 8000 r/min for 5 min. The separated and collected sample was dried at 100° C. for 12 h, and then calcined at 550° C. for 6 h. After cooling, a nanoporous silica was collected.

(5) 4.5 g of tetraethylenepentamine (TEPA) was added, dissolved, and dispersed into 25 mL of methanol, and then 1 g of nano-silica powder was added and fully stirred at a rotate speed of 400 r/min. After the methanol was evaporated, the residual was placed in a vacuum drying oven and dried at 60° C. for 5 h, thereby obtaining a nano silicon-based solid amine sorbent for $CO_2$.

(6) The obtained nano silicon-based solid amine sorbent for $CO_2$ was performed for 100 vol. % $CO_2$ gas flow at 90° C., and then was regenerated in the pure Ar gas flow at 120° C. The adsorption-desorption test was cycled for 10 times.

Analysis of Products in Examples

Referring to Table 1 and FIG. 1, after the measurement, all of the silicon-based supports in Examples 1 to 6 have relatively large specific surface areas and pore volumes. Among them, the specific surface area of the silicon-based support in Example 6 was up to 964.8 $m^2/g$, and the pore volume was up to 3.57 $cm^3/g$, which were much larger than the specific surface area and pore volume of the existing silicon-based support. The silicon-based solid amine sorbent for $CO_2$ formed by this silicon-based support had a saturated $CO_2$ adsorption capacity of more than 336 mg/g, and can be regenerated under a pure Ar gas flow condition. After 10 cycles, the adsorption capacity of the silicon-based solid amine sorbent for $CO_2$ was merely attenuated by less than 7%, exhibiting an excellent adsorption-regeneration cycle performance.

TABLE 1

Porosity parameters of silicon-based support samples

| Sample | BET ($m^2/g$) | $V_{pore}$ ($cm^3/g$) | $D_{average}$ (nm) |
|---|---|---|---|
| Example 1 | 220.0 | 2.30 | 39.2 |
| Example 2 | 180.2 | 1.85 | 26.5 |
| Example 3 | 421.3 | 3.00 | 32.0 |
| Example 4 | 350.5 | 2.52 | 26.1 |
| Example 5 | 874.2 | 1.99 | 7.47 |
| Example 6 | 964.8 | 3.57 | 14.64 |

TABLE 2

$CO_2$ adsorption parameters of solid amine sorbent for $CO_2$

| Sample | First adsorption capacity (mg/g) | Adsorption capacity after 10 cycles (mg/g) |
|---|---|---|
| Example 1 | 112 | 110 |
| Example 2 | 101 | 98 |
| Example 3 | 198 | 194 |
| Example 4 | 165 | 160 |
| Example 5 | 204 | 187 |
| Example 6 | 320 | 298 |

The present disclosure also provides a silicon-based solid amine sorbent for $CO_2$ prepared by the making method as described above.

The silicon-based solid amine sorbent for $CO_2$ and the making method thereof provided in the present disclosure have the following advantages:

(1) Only a small amount of surfactant is added or no surfactant is added, and neither template nor pore-enlarging agent is added in the making process. The organic alcohol used in the azeotropic distillation is cheap, recyclable, reusable, more environmentally friendly, and advantageous in economy.

(2) The operation process is simple, the reaction conditions are mild, the operation is easy to be controlled, and no complicated equipment is required. Thus the method has strong market competitiveness and is suitable for industrial production;

(3) The pore volume and specific surface of the prepared silicon-based support are larger than 800 $m^2/g$ and 3.5 $cm^3/g$, respectively, which breaks through the technical bottleneck in the increase of the pore volume of silicon-based materials; and (4) The saturated $CO_2$ adsorption capacity of the synthesized solid amine sorbent for $CO_2$ reaches 336 mg/g. The solid amine sorbent for $CO_2$ can be regenerated in pure Ar gas flow condition. The adsorption capacity of the solid amine sorbent for $CO_2$ is merely attenuated by less than 7% after 10 cycles, exhibiting an excellent adsorption-regeneration cycle performance.

The technical features of the above-mentioned embodiments may be combined arbitrarily. To simplify the description, not all the possible combinations of the technical features in the above embodiments are described. However, all of the combinations of these technical features should be considered as within the scope of the present disclosure, as long as such combinations do not contradict with each other.

The above embodiments merely illustrate several embodiments of the present disclosure, and the description thereof is specific and detailed, but it shall not be constructed as limiting the scope of the present disclosure. It should be noted that various variations and modifications may be made by those skilled in the art without departing from the spirit of the present disclosure, which are all within the scope of protection of the present disclosure. Therefore, the protection scope of the present disclosure shall be subject to the appended claims.

What is claimed is:

1. A making method of a silicon-based solid amine sorbent for $CO_2$, comprising:
   providing a silicon source liquid which is a silicate solution or a liquid organosilicate, wherein the silicate solution comprises water and a first silicate dissolved in the water;
   mixing the silicon source liquid with a precipitant to perform a precipitation reaction to obtain a product liquid containing a precipitate, wherein the precipitate is a second silicate or silicic acid;

filtering out the precipitate and washing the precipitate with water;

mixing the precipitate filtrated out but not dried yet with an organic alcohol and then performing an azeotropic distillation to obtain a dehydrated precipitate;

calcining the dehydrated precipitate to obtain a silicon-based support, wherein the silicon-based support is a powder of the second silicate powder or a silica powder; and impregnating the silicon-based support with an organic amine solution and then drying the silicon-based support impregnated with the organic amine solution to obtain the silicon-based solid amine sorbent for $CO_2$.

2. The making method according to claim 1, wherein the silicon source liquid is the silicate solution, and the first silicate is $Na_2SiO_3$ or $K_2SiO_3$.

3. The making method according to claim 2, wherein a concentration of the first silicate in the silicate solution is 5 g/L to 100 g/L.

4. The making method according to claim 2, wherein the precipitant is a $CO_2$-containing gas or a $Ca(OH)_2$ solution.

5. The making method according to claim 4, wherein a concentration of $CO_2$ in the $CO_2$-containing gas is 15 vol. % to 40 vol. %, and a flow rate of the $CO_2$-containing gas is 400 mL/min to 2000 mL/min per liter of the silicate solution.

6. The making method according to claim 4, wherein a concentration of $Ca(OH)_2$ in the $Ca(OH)_2$ solution is 0.05 mol/L to 1 mol/L.

7. The making method according to claim 1, wherein the silicon source liquid is the liquid organosilicate, and the liquid organosilicate is selected from ethyl orthosilicate, methyl orthosilicate, and a combination thereof.

8. The making method according to claim 7, wherein the precipitant is a mixed liquid of n-butyraldehyde, cetyl trimethyl ammonium bromide, and ammonium hydroxide.

9. The making method according to claim 8, wherein the mixed liquid is prepared by a method comprising:

mixing n-butyraldehyde, cetyl trimethyl ammonium bromide, and water uniformly to obtain a premixed liquid; and mixing ammonium hydroxide with the premixed liquid uniformly to obtain the mixed liquid.

10. The making method according to claim 9, wherein a ratio of n-butyraldehyde, cetyl trimethyl ammonium bromide, water, and ammonium hydroxide in the mixed liquid is (5 ml-20 ml):(0.5 g-10 g):(10 ml-150 ml):(5 ml-100 ml), and a mass fraction of ammonium hydroxide is 25% to 28%.

11. The making method according to claim 10, wherein a volume ratio of the mixed liquid to the liquid organosilicate is 5:1 to 20:1.

12. The making method according to claim 1, wherein a temperature of the precipitation reaction between the silicon source liquid and the precipitant is 25° C. to 80° C.

13. The making method according to claim 1, wherein the organic alcohol is selected from ethanol, propanol, n-butanol, isobutanol, and any combination thereof.

14. The making method according to claim 1, wherein a temperature of the calcining is 400° C. to 600° C.

15. The making method according to claim 1, wherein the organic amine solution comprises an organic solvent and an organic amine dissolved in the organic solvent, the organic amine is selected from polyethyleneimine, diethylenetriamine, tetraethylenepentamine, pentaethylenehexamine, and any combination thereof, and the organic solvent is selected from methanol, ethanol, acetone, and any combination thereof.

16. The making method according to claim 1, wherein a concentration of the organic amine in the organic amine solution is 4 g/L to 200 g/L, and a ratio of the silicon-based support to the organic amine solution is 10 g/L to 100 g/L.

* * * * *